United States Patent

Anderson

[15] 3,699,967
[45] Oct. 24, 1972

[54] ELECTROSURGICAL GENERATOR
[72] Inventor: Robert K. Anderson, Boulder, Colo.
[73] Assignee: Valleylab, Inc., Boulder, Colo.
[22] Filed: April 30, 1971
[21] Appl. No.: 139,085

[52] U.S. Cl.......................128/303.14, 128/DIG. 22
[51] Int. Cl. ...........................................A61b 17/36
[58] Field of Search.......128/303.13, 303.14, 303.15,
    128/303.16, 303.17, 419 R, DIG. 22; 321/2,
    4; 331/61

[56] References Cited

UNITED STATES PATENTS

| | | | |
|---|---|---|---|
| 3,058,470 | 10/1962 | Seeliger et al. | 128/303.14 |
| 3,478,744 | 11/1969 | Leiter | 128/303.14 |
| 3,601,126 | 8/1971 | Estes | 128/303.14 |
| 3,089,496 | 5/1963 | Degelman | 128/303.14 |
| 3,595,221 | 7/1971 | Blackett | 321/4 |

Primary Examiner—Gerald Goldberg
Attorney—Duane Burton

[57] ABSTRACT

An isolated output electrosurgical generator suitable for generating cutting and coagulation electrosurgical currents is described. The electrosurgical generator using a single power stage generates three distinct and independent currents—a coagulation current for hemostasis or tissue destruction; a pure cutting current for cutting with a minimum amount of hemostasis; and a blended cutting current with a moderate amount of hemostasis. The electrosurgical generator includes a solid state power stage driven by two discrete frequencies that provide substantially differing cutting and coagulation characteristics. The electrosurgical generator also includes a solid state control circuit that controls the operation of the power stage. More specifically, the control circuit controls whether the power stage generates a current near the resonant frequency of the LC circuit so that a coagulation current or a blended cutting current is generated or whether the power stage generates a current at another frequency whereby a pure cutting current is generated. The output from the power stage is connected through an output circuit to suitable electrosurgical instrument terminals. An indicator circuit is used to provide audio and visual indication of activation of the electrosurgical generator. In addition, the electrosurgical generator provides electrical isolation on all output connections to prevent patient burns caused by alternate return current paths.

24 Claims, 9 Drawing Figures

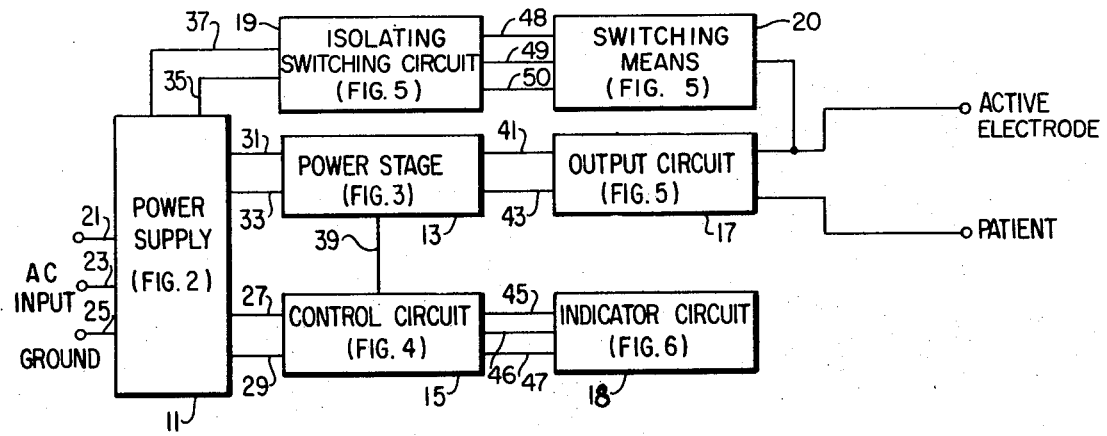
FIG.1
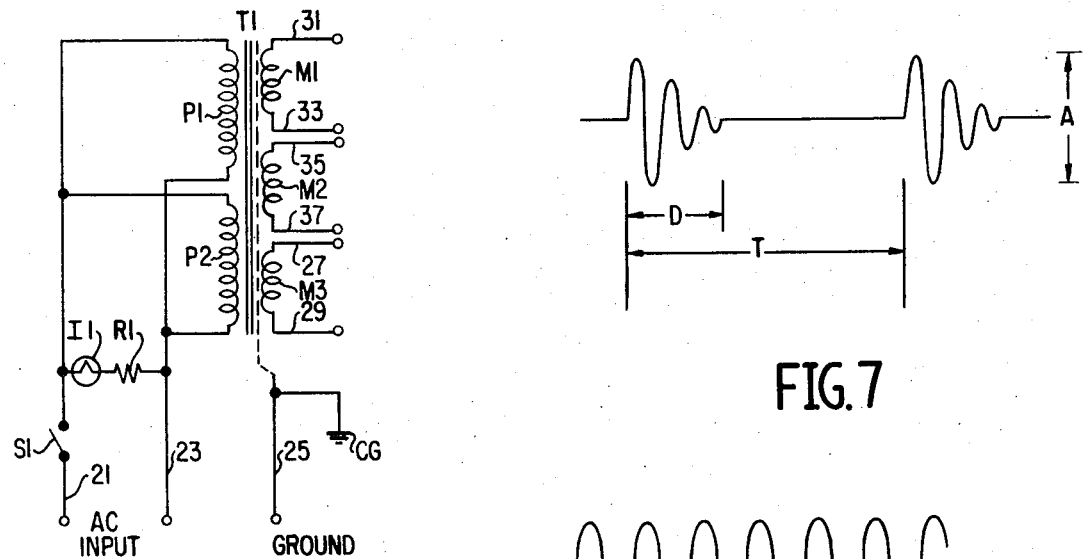
FIG.2
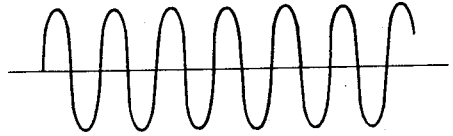
FIG.7
FIG.8
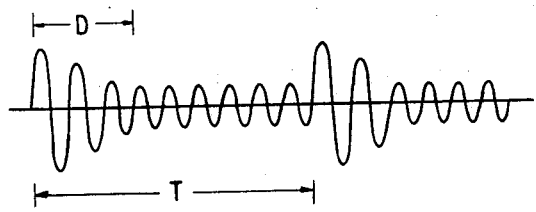
FIG.9

ELECTROSURGICAL GENERATOR

BACKGROUND OF THE INVENTION

This invention relates to electrosurgical apparatus and more particularly to an isolated output solid state electrosurgical generator suitable for generating cutting and coagulation electrosurgical currents.

Various types of electrosurgical generators suitable for generating cutting and coagulation electrosurgical currents have been proposed and are in use. In some cases, the currents are provided by separate generators, i.e., one generator generates a cutting electrosurgical current and the other generator generates a coagulation electrosurgical current. In many cases, the generator that generates the cutting electrosurgical current includes a vacuum tube oscillator that generates a signal at a frequency suitable for cutting the tissue of a human being yet high enough so as not to effect the nerve functions of the body. In addition, very often, the coagulation current electrosurgical generator includes a spark gap device which generates short bursts of high frequency, high voltage energy at predetermined intervals.

It will be appreciated that it is undesirable to provide two separate generators for performing these current generating functions since it is often desirable to perform cutting and coagulation electrosurgical operations sequentially. In addition, it will be appreciated that vacuum tube and/or spark gap systems are inherently less reliable that are systems made from solid state components, for example.

Prior to this invention, electrosurgical generators return the patient plate (e.g., indifferent electrode) to power ground. This was done because of inherently high radio-frequency leakage to power ground in the prior art.

Therefore, it is an object of this invention to provide a new and improved electrosurgical generator.

It is also an object of this invention to provide a new and improved electrosurgical generator incorporating adequate electrical isolation on all output terminals.

It is also an object of this invention to provide an electrosurgical generator suitable for generating both cutting and coagulation electrosurgical currents.

It is still another object of this invention to provide a unitary solid state electrosurgical generator suitable for generating cutting and coagulation electrosurgical currents.

Recently, attempts have been made to provide a unitary electrosurgical generator that generates both cutting and coagulation electrosurgical currents without requiring the inclusion of a vacuum tube oscillator and a spark gap generator. However, for one reason or another, these attempts have not been entirely satisfactory. For example, at least one device generates cutting and coagulation currents at the same voltage amplitude and frequency. However, it will be appreciated by those skilled in the art and others that while the frequency of operation, as long as it is high enough so as not to affect body functions, is relatively unimportant, the voltage amplitude of the currents is important. For example, it is desirable that the peak-to-peak voltage amplitude of the coagulation current be relatively high whereas it is desirable that the peak-to-peak voltage amplitude of the cutting current be considerably lower.

Hence, it is a still further object of this invention to provide a unitary electrosurgical generator suitable for generating cutting and coagulation electrosurgical currents where the generated peak-to-peak voltage of the coagulation current is substantially higher than the generated peak-to-peak voltage of the cutting current.

An additional object of this invention is to provide audio and visual indication of activation of the electrosurgical generator.

SUMMARY OF THE INVENTION

In accordance with principles of this invention an electrosurgical generator suitable for generating cutting and coagulation electrosurgical currents is provided. The electrosurgical generator generates at least two and can generate three distinct and independent currents—a coagulation current for hemostasis or tissue destruction; a pure cutting current for cutting with a minimum amount of hemostasis; and a blended cutting current for cutting with a moderate amount of hemostasis. The type of cutting current desired is selected by the setting of a pure/blend switch. Cutting intensity is controlled by a cut level potentiometer and both cutting modes are completely independent of coagulation current. Coagulation intensity is controlled by a coagulation level potentiometer. The type of current flow to an electrosurgical instrument connected to the generator of the invention is controlled by either a switch in the instrument or a separate foot switch, as desired.

In accordance with other principles of this invention, the coagulation and blended cutting currents are generated at one frequency and the pure cutting current is generated at another frequency. Moreover, the peak-to-peak voltage amplitude of the coagulation current is considerably higher than the maximum peak-to-peak voltage amplitude of the cutting current.

In accordance with still further principles of this invention the electrosurgical generator includes a solid state power stage including an LC resonant circuit that resonates near the frequency of the coagulation current. The apparatus also includes a solid state control circuit that controls the operation of the solid state power stage. More specifically, the control circuit controls whether the solid state power stage generates a coagulation current, a pure cutting current, or a blended cutting current. If a coagulation current is to be generated the control circuit causes the power stage to generate a decaying sinusoidal current at the resonant frequency of the LC circuit at predetermined intervals. Alternatively, if a pure cutting current is desired, the control circuit causes the power stage to generate a continuous sinusoidal current at a frequency different than the resonant frequency of the LC circuit so that the waveform has a considerably lower peak-to-peak voltage than does the coagulation current. Further, if a blended cutting current is desired the control circuit causes the power stage to generate a decaying sinusoidal current at a frequency equal to the coagulation current frequency, but different than the pure cutting current frequency. The decay time of the current in the case of the blended current is generated such that it is apparently greater than the decay time of the coagulation current, providing greater energy to allow surgical cutting.

In accordance with other principles of this invention, an output circuit is connected between the output of the power stage and terminals to which electrosurgical instruments may be connected. The output circuit includes means for controlling the control circuit so that the control circuit causes the power stage to operate in the desired manner. In addition, an indicator circuit is connected to the output of the control circuit to provide both visual and audio indications of the operation of the electrosurgical generator of the invention. Further, the electrosurgical generator incorporates isolating circuits to achieve the desired level of patient safety.

It will be appreciated from the foregoing brief description of the invention that an electrosurgical generator suitable for generating both cutting and coagulation currents is provided. The generator is unitary in that it is a single apparatus that generates both types of electrosurgical currents. Further, the use of an LC resonant circuit to provide high open circuit voltage at the coagulation current frequency and low open circuit voltage at the cutting frequencies results in a peak-to-peak voltage being applied at the output to an electrosurgical instrument that is relatively low for cutting and relatively high for coagulation.

BRIEF DESCRIPTION THE THE DRAWINGS

The foregoing objects and many of the attendant advantages of this invention will become more readily appreciated as the same becomes better understood from the following more detailed description of a preferred embodiment of the invention when taken in conjunction with the accompanying drawings, wherein:

FIG. 1 is a block diagram illustrating an electrosurgical generator formed in accordance with the invention;

FIG. 2 is an electrical schematic diagram illustrating a power supply suitable for use in the embodiment of the invention illustrated in FIG. 1;

FIG. 7 is a waveform diagram illustrating the general waveform of the coagulation current generated by the invention;

FIG. 8 is a waveform diagram illustrating the waveform of the pure cutting current generated by the invention; and FIG. 9 is a waveform diagram illustrating the waveform of the blended cutting current generated by the invention.

DESCRIPTION OF THE PREFERRED EMBODIMENT

Figure 3:
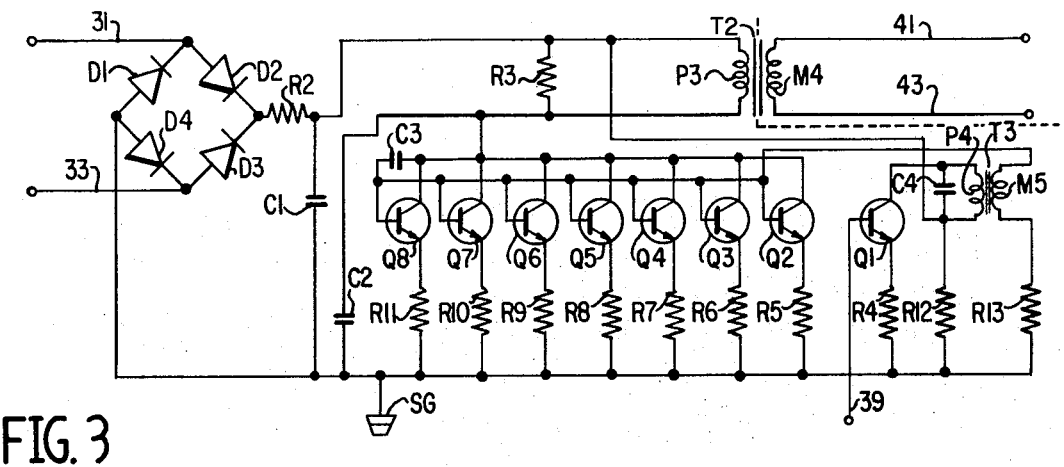
FIG. 3 is an electrical schematic diagram illustrating a power stage suitable for use in the embodiment of the invention illustrated in FIG. 1.

FIG. 1 is a block diagram of a preferred embodiment of the invention and comprises: a power supply 11; a power stage 13; a control circuit 15; an isolating output circuit 17; an indicator circuit 18, an isolating switching circuit 19, and a switching means 20. The power supply 11 receives conventional 115 volt AC power on two lines 21 and 23. Line 25 represents the ground line.

The power supply has three pairs of output lines designated: 27, 29; 31, 33; and 35, 37. The lines designated 27, 29 are connected to the power input of the control circuit 15; the lines designated 31, 33 are connected to the power input of the power stage 13; and, the lines designated 35, 37 are connected to the power input of the isolating switching circuit 19. The control circuit 15 has a single control output line 39 that is connected to the power stage 13. The power stage has a pair of current output lines 41, 43 which are connected to the current input of the isolating circuit 17. The control circuit 15 has three indicator output lines 45, 46 and 47 which are connected to inputs of the indicator circuit 18. The isolating circuit has two output lines connected to output terminals, one of said terminals being designated "active electrode" and the other being designated "patient." The isolating switching circuit is connected to the switching means by lines 48, 49 and 50. The isolating switching circuit is interconnected to the control circuit through a multiplicity of relay contacts hereinafter described.

In general, the power supply 11 provides power for the power stage 13, the control circuit 15 and the isolating output circuit 17. The control circuit is a solid state logic circuit that applies control signals along line 39 to the power stage 13 so as to control the characteristics of the current on the pair of current output lines 41 and 43. The isolating output circuit applies the current on the current output lines 41 and 43 to the appropriate output terminals. In addition, the isolating output circuit is coupled to the control circuit 15 through the switching means 20 and isolating switching circuit 19 whereby the control circuit applies signals on the line 39 in accordance with the desires of a person performing an electrosurgical operation using the invention. Finally, the control circuit applies suitable signals on the three indicator output lines 45, 46 and 47 which cause suitable audio and/or visual indications to be generated by the indicator circuit 18.

Turning now to a description of the preferred electrical circuits for carrying on the functions illustrated in block form in FIG. 1; FIG. 2 is an electrical schematic diagram of a preferred embodiment of the power supply 11 illustrated in FIG. 1. The power supply illustrated in FIG. 2 comprises: a transformer designated T1; and indicator lamp designated I1; a resistor designated R1; and, a switch designated S1. S1 is a single pole, single throw switch and, T1 includes two primary windings designated P1 and P2 and three secondary windings designated M1, M2 and M3.

Line 21 is connected through S1 to: one side of P1; one side of P2; and, one side of I1. The other side of I1 s connected through R1 of line 23. Line 23 is also connected to to the other sides of P1 and P2. Line 25 is connected to a chassis ground designated CG and to the shield of T1. M1 is connected to lines 31 and 33; M2 is connected to lines 35 and 37; and, M3 is connected to lines 27 and 29.

FIG. 3 is an electrical schematic diagram of a preferred embodiment of a power stage suitable for use in the embodiment of the invention illustrated in FIG. 1. The power stage illustrated in FIG. 3 comprises: eight NPN transistors designated Q1–Q8; four diodes designated D1–D4; four capacitors designated C1–C4; two transformers designated T2 and T3; and twelve resistors designated R2–R13. Transformer T2 is constructed to provide maximum isolation.

D1–D4 are connected together to form a bridge circuit. More specifically, the anodes of D1 and D4 are connected together, and the cathodes of D2 and D3 are connected together. The cathode of D1 is connected to the anode of D2, and the cathode of D4 is connected to the anode of D3. Line 31 is connected to the junction between D1 and D2 and line 33 is connected to the junction between D4 and D3. The junction between D1 and D4 is connected to signal ground designated SG. The junction between D2 and D3 is connected through R2 to one side of the primary winding T2, designated P3. R3 is connected in parallel with P3.

The junction between R2 and R3 is connected through C1 to SG. The other side of P3 is connected through C2 to SG. The secondary winding of T2 is designated M4 and is connected to lines 41 and 43. The secondary winding M4 of T2 and lines 41 and 43 are part of the isolating output circuit 17.

The bases of Q2–Q8 are all connected together as are the collectors of Q2–Q8. C3 is connected between the collectors of Q2–Q8 and the bases of Q2–Q8. One side of each of R5–R11 is connected to SG. The other side of R5 is connected to the emitter of Q2; and the other side of R6 is connected to the emitter of Q3; and the other side of R7 is connected to the emitter of Q4; the other side of R8 is connected to the emitter of Q5; the other side of R9 is connected to the emitter of Q6; the other side of R10 is connected to the emitter of Q7; and, the other side of R11 is connected to the emitter of Q8. The collectors of Q2–Q8 are also connected to the junction between C2 and the other side of P3.

Line 39 is connected to the base of Q1. The emitter of Q1 is connected through R4 to SG and the collector of Q1 is connected to one side of the primary winding of T3, designated P4. The other side of P4 is connected through R12 to SG and to the junction between R3 and P3. C4 is connected in parallel with P4. The secondary winding of T3 is designated M5 and has one end connected through R13 to SG and on the other end connected to the bases of Q2–Q8.

It will be appreciated by those skilled in the art from the foregoing description that transistors Q2–Q8 are connected in parallel and control the flow of current through the primary winding P3. Because a plurality of transistors connected in parallel are used, current flow can be relatively high without transistor failure. Q1, because it is coupled to the bases of Q2–Q8, controls the conduction of Q2–Q8. More specifically, when Q1 receives a signal from the hereinafter described control circuit on line 39, it conducts and causes a voltage to be applied to the bases of Q2–Q8 whereby they become conductive and conduct current rectified by D1–D4 and smoothed by C1. The inductance of T2 and the capacitance of C2 and C3 is such that these elements form an LC resonant circuit. R3 provides a measure of damping for P3. When Q1 is switched on and off at the resonant frequency of this resonant circuit the signal on the output lines 41 and 43 has a high peak-to-peak voltage because of the high primary voltage on T2 caused by the resonant circuit. As will be better understood from the following description of the operation of the invention this situation occurs when a coagulation current is being generated.

It will be appreciated by those skilled in the art that, preferably, Q2–Q8 are mounted in a suitable heat sink. In addition, preferably, the heat sink is cooled by a cooling fan (not shown) which may be driven directly from the AC input to the power supply illustrated in FIG. 2.

Figure 4:
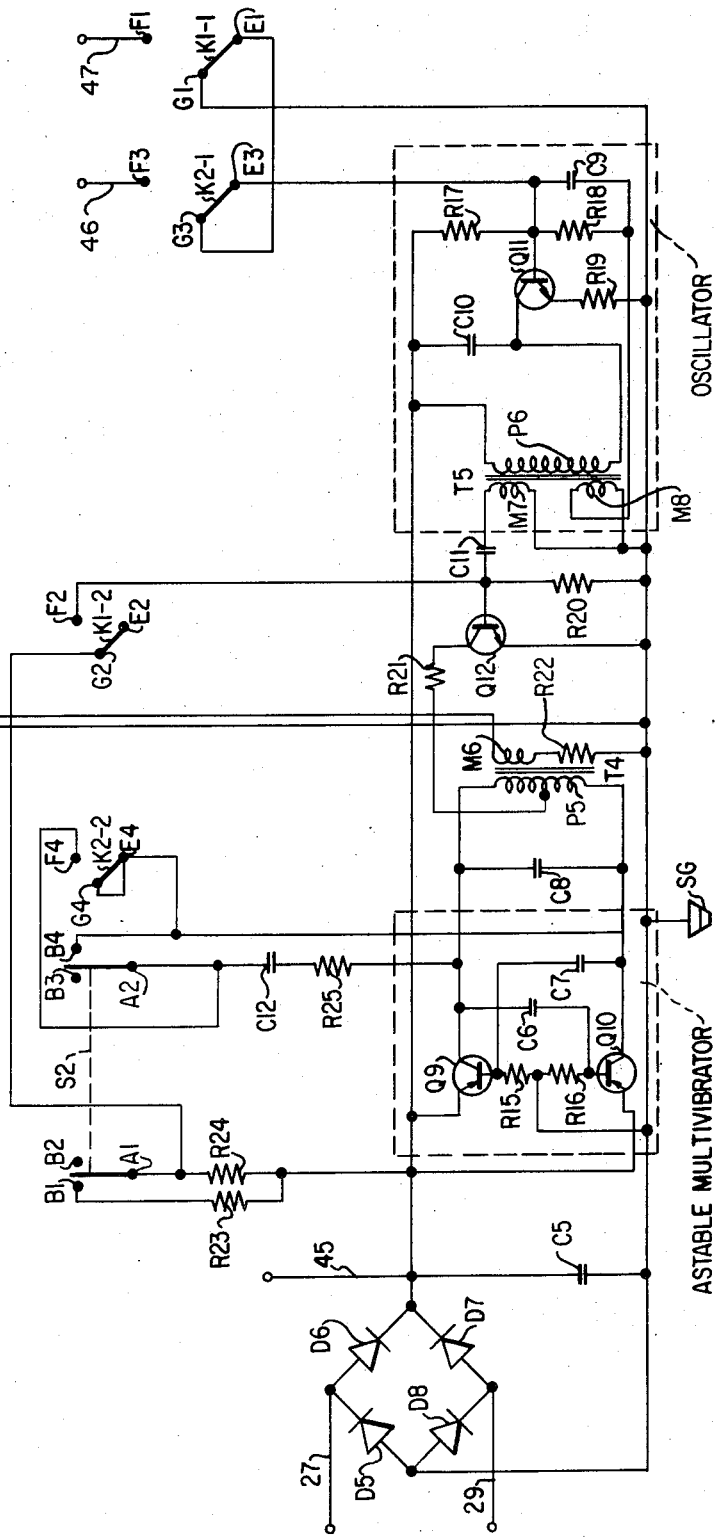
FIG. 4 is an electrical schematic diagram illustrating a control circuit suitable for use in the embodiment of the invention illustrated in FIG. 1.

FIG. 4 is an electrical schematic diagram of a preferred embodiment of a control circuit suitable for use in the embodiment of the invention illustrated in FIG. 1. The control circuit illustrated in FIG. 4 comprises: two PNP transistors designated Q9 and Q10; two NPN transistors designated Q11 and Q12; four diodes designated D5–D8; eight capacitors designated C5–C12; two transformers designated T4 and T5; fifteen resistors designated R15–R29; two potentiometers designated R30 and R31; and a double pole-double throw switch designated S2. In addition, two sets of relay contacts K1-1 and K1-2 (operated by a relay coil K1 illustrated in FIG. 5 and hereinafter described) are illustrated in FIG. 4. Further, three sets of relay contacts designated K2-1, K2-2 and K2-3 (operated by a relay coil K2 illustrated in FIG. 5) are also illustrated in FIG. 4.

Diodes D5–D8 are connected to form a bridge circuit. More specifically, the anodes of D5 and D8 are connected together, and the cathodes of D6 and D7 are connected together. In addition, the cathode of D5 is connected to the anode of D6, and the cathode of D8 is connected to the anode of D7. The junction between D5 and D6 is connected to line 27, and the junction between D7 and D8 is connected to line 29. The junction between D5 and D8 is connected to SG (signal ground), and the junction between D6 and D7 is connected through C5 to SG. Hence, C5 acts as a smoothing capacitor to filter the AC signal rectified by the diode bridge. The junction between D6 and D7 is also connected to line 45 to supply power to the indicator circuit 19 illustrated in FIG. 6 and hereinafter described.

The emitters of Q9 and Q10 are connected together and to the junction between D6 and D7. The bases of Q9 and Q10 are connected together through the series combination of R15 and R16. The junction between R15 and R16 is connected to SG. The base of Q9 is also connected through C7 to the collector of Q10, and the base of Q10 is connected through C6 to the collector of Q9. C8 is connected between the collectors of Q9 and Q10 as is the primary winding of T4, the primary winding being designated P5.

T5 includes a single primary winding designated P6 and a pair of secondary windings designated M7 and M8. One end of M8 is connected to SG and the other end is connected to one side of R18 and one side of C9. The other sides of R18 and C9 are connected to the base of Q11. The base of Q11 is also connected through R17 to the junction between D6 and D7. The emitter of Q11 is connected through R19 to SG, and the collector of Q11 is connected to one side of P6 and through C10 to the junction between D6 and D7. The other side of P6 is also connected to the junction between D6 and D7. M7 has one side connected to SG and the other side connected through C11 to the base of Q12. The base of Q12 is also connected through R20 to SG. Further, the emitter of Q12 is connected to SG. The collector of Q12 is connected through R21 to a center tap on P5.

As stated above, S2 is a double pole-double throw switch. Hence, S2 has a pair of common terminals (designated A1 and A2) and four separate terminals (designated B1, B2, B3 and B4). B1 and B2 are associated with A1, and B3 and B4 are associated with A2. S2, as hereinafter described, is a blend/pure switch which controls the envelope of the cut current so that either a pure cut current or a blend cut current is provided by the invention, as desired. In any event, A1 is connected through R24 to the junction between D6 and D7. B1 is connected through R23 to the junction between D6 and D7 and B2 is unconnected. A2 is connected through C12 in series with R25 to the collector of Q9. B4 is connected to the collector of Q10 and B3 is unconnected.

K1-1 includes: a common terminal designated G1; a lower terminal designated E1; and, an upper terminal designated F1. Similarly, K1-2 includes: a common terminal designated G2; a lower terminal designated E2; and an upper terminal designated F2. K2-1 includes: a common terminal designated G3; a lower terminal designated E3; and, an upper terminal designated F3. K2-2 includes: a common terminal designated G4; a lower terminal designated E4; and an upper terminal designated F4. Finally, K2-3 includes: a common terminal designated G5; a lower terminal designated E5; and an upper terminal designated F5. K1-1, K1-2, K2-1, K2-2 and K2-3 are shown in normally disposed positions in FIG. 4 wherein their respective common terminals are connected to their respective lower terminals. It will be appreciated by those skilled in the art, that, as herein used, "upper and lower terminals" merely describe the arrangement of these contacts as they are illustrated in FIG. 4, i.e., this terminology is used for purposes of orientation only.

G1 is connected to SG; E1 is connected to G3; and, F1 is connected to line 47. E3 is connected to the base of Q11 and F3 is connected to line 46. G2 is connected to the junction between A1 and R24; E2 is unconnected; and, F2 is connected to the base of Q12. G4 is connected to E4 and to B4; and, F4 is connected to A2.

G5 is connected through R29 to SG. R30 and R31 are connected in parallel between SG and one side of the secondary winding of T4 designated M6. The other side of M6 is connected through R22 to SG. The center tap of R30 is connected to F5 and the center tap of R31 is connected through R28 to E5. F5 is also connected through R26 to the non SG side of M6. In addition, R27 is connected between E5 and the non SG side of M6. Finally, G5 is connected to output line 39.

It will be appreciated by those skilled in the art and others from the foregoing description and viewing FIG. 4 that the preferred embodiment of the control circuit contains several sub-circuits. For example, Q9 and Q10 plus their associated resistors (R15 and R16) and cross-coupling capacitors (C6 and C7) comprise an astable multivibrator. In other words, Q9 and Q10, when energized, continuously switch back and forth so as to present a constant frequency signal to C8 and the primary winding (P5) to T4 in the absence of other signals. In addition, it will be appreciated that Q11 in combination with T5 and the resistors and capacitors associated with these elements comprise an oscillator. T4 and Q12, because they are coupled to both the astable multivibrator and the oscillator, serve to modulate or control the astable multivibrator duty cycle. The resultant signal is applied to the voltage divider network comprising resistors R26–R31 and illustrated in the upper part of FIG. 4.

K2-1 and K1-1, as hereinafter described, are coupled to the indicator circuit (FIG. 6) so that a suitable indication of the mode of operation is provided when the electrosurgical generator is energized. K1-2 controls whether resistors R24 and/or R23 are to be included in the control circuit and K2-2 controls whether C12 and R25 are to be included in the control circuit. In addition, S2 determines whether, in an alternate mode of operation, C12 and R25 are to be included in the control circuit or whether, in a different mode of operation, an additional resistance (R23) is to be included in the circuit. In other words, S2 and the relay contact elements vary the overall arrangement of the control circuit so that the various modes of operation are created. A more complete description of how the circuit elements illustrated in FIG. 4 create these changes is hereinafter presented, the foregoing merely being intended to provide a general description of the sub-systems illustrated in FIG. 4.

Figure 5:
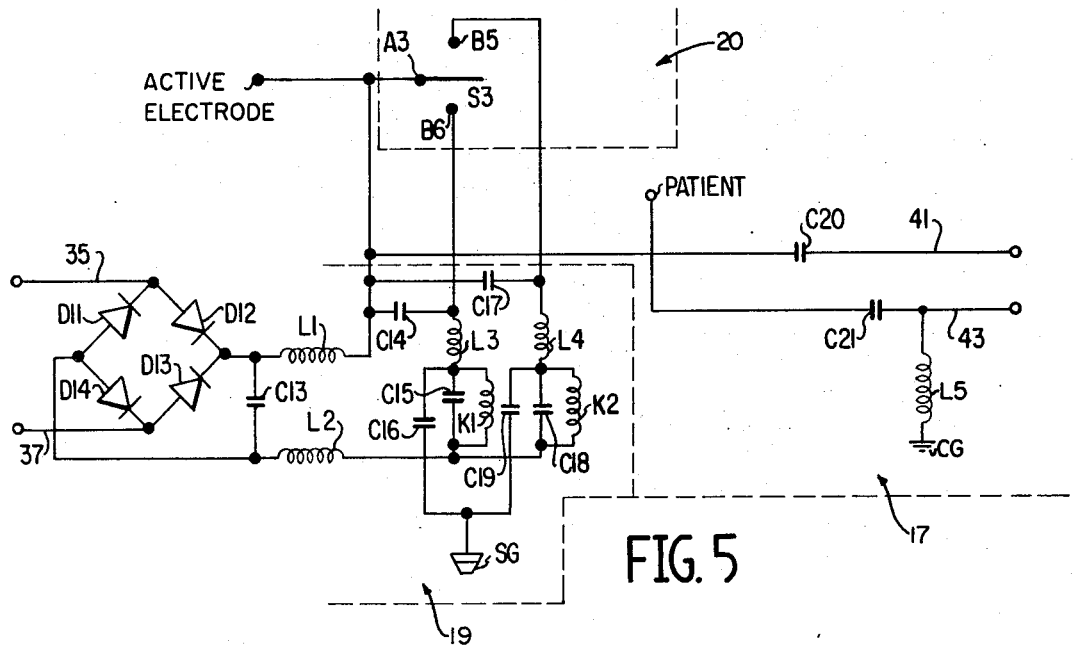
FIG. 5 is an electrical schematic diagram illustrating the isolating switching circuit, switching means and a portion of the isolating output circuit which are suitable for use in the embodiment of the invention illustrated in FIG. 1.

FIG. 5 is an electrical schematic diagram of a preferred embodiment of the isolating switching circuit 19, the switching means 20 and a portion of the isolating output circuit 17 (the remaining portion of said circuit 17 being shown in FIG. 3). The isolating switching circuit 19 illustrated in FIG. 5 comprises: four diodes designated D11–D13; seven capacitors designated C13–C19; four inductors designated L1–L4; and, two relay coils designated K1 and K2. In addition, illustrated in FIG. 5 is a portion of the isolating output circuit comprising the two output terminals, one of which is designated "active electrode," and the other of which is designated "patient," two capacitors C20 and C21 and one other inductor L5. The switching means 20 illustrated in FIG. 5 comprises a common terminal designated A3 of a single pole-double throw switch designated S3. A3 is also connected to the active electrode terminal that is manipulated by the surgeon using the invention, in a manner well known in the art, to perform cutting or coagulation operations. The separate terminals of S3 are designated B5 and B6, B5 is connected to the common junction of inductor L4 and capacitor C17. B6 is connected to the common junction of inductor L3 and capacitor C14.

D11–D14 are connected so as to form a bridge circuit. More specifically, the anodes of D11 and D14 are connected together, and the cathodes of D12 and D13 are connected together. The cathode of D11 is connected to the anode of D12, and the cathode of D14 is connected to the anode of D13. Line 35 is connected to the junction between D11 and D12, and line 37 is connected to the junction between D13 and D14. C13 is connected from the junction between D11 and D14 to the junction between D12 and D13 and acts as a smoothing capacitor. The junction between D12 and D13 is also connected through L1 to the leftmost active terminal. The junction between D11 and D14 is also connected through L2 to one side of K1 and to one side of K2. The other side of K1 is connected through C16 to SG (signal ground) and the other side of K2 is connected through C19 to SG. C15 is connected in parallel with K1 and C18 is connected in parallel with K2. C14 is connected in series with L3 between the leftmost active terminal and the other side of K1. C17 is connected in series with L4 between the leftmost active terminal and the other side of K2. The junction between C14 and L3 is connected to the center active terminal and the junction between C17 and L4 is connected to the rightmost active terminal. In addition, C20 is connected between line 41 and the common junction between capacitor C14, inductor L1 and the active electrode. Finally, C21 is connected between the patient terminal and the common junction of inductor L5 and line 43. The other side of L5 is connected to the chassis ground (CG).

In general, the circuits illustrated in FIG. 5 allow RF current to flow through the active electrode terminal and return substantially through the patient terminal, and provides a means for controlling the energization of the relay coils K1 and K2 so that the appropriate relay contacts are closed and open for the desired mode of operation. More specifically, preferably, the active electrode terminal is connected to a surgical instrument which includes S3, i.e., the surgical instruments includes the active electrode and the elements located within the dashed line used to designate the switching means 20. Preferably, S3 is a double action switch which may or may not have an intermediate position but preferably has an intermediate position for this application. In any event, S3 either connects the active electrode terminal to the common junction for L3 and C14 as aforedescribed or to the common junction of C17 and L4, depending upon the desired mode of operation. When one of these contacts is made either C14 or C17 is bypassed (these capacitors act as radio frequency by-pass capacitors to prevent high RF voltage from damaging S3's contacts). Whether K1 or K2 is energized is determined by which capacitor is bypassed, i.e., when C14 is bypassed K1 is energized and when C17 is bypassed K2 is energized because bypassing these capacitors allows DC current to flow through the switch contacts to the relay coil. In any event, when either of these coils is energized, its associated relay contacts change position.

It should be noted that the current flowing to the active electrode terminal from line 41 and returning through line 43 does not pass through the relay coils because L3 and C16 or L4 and C19, as the case may be, are low pass filters which pass DC but do not pass the high frequency AC applied by the active electrode.

Figure 6:
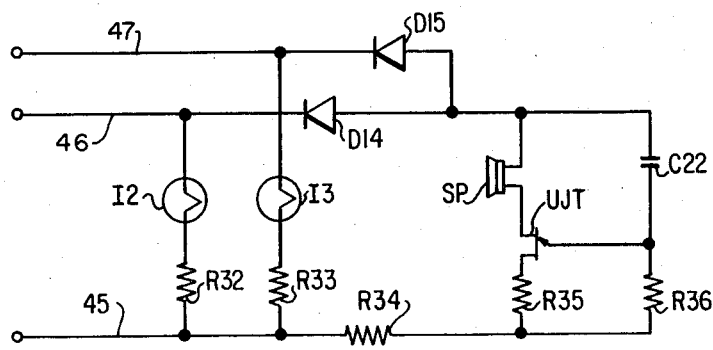
FIG. 6 is an electrical schematic diagram illustrating an indicator circuit suitable for use in the embodiment of the invention illustrated in FIG. 1.

FIG. 6 is an electrical schematic diagram of an indicator circuit suitable for use in the embodiment of the invention illustrated in FIG. 1. The indicator circuit illustrated in FIG. 6 comprises: a unijunction transistor designated UJT; two diodes designated D14 and D15; a capacitor designated C22; two indicator lamps designated I2 and I3; a speaker designated SP; and, five resistors designated R32–36.

Line 45 is connected through R34 in series with R36 to the emitter of UJT. The B2 base of UJT is connected through R35 to the junction between R34 and R36. The B1 base of UJT is connected through SP in series with C22 to the emitter of UJT. The junction between SP and C22 is connected to the anodes of D14 and D15. The cathode of D14 is connected to signal line 46 and the cathode of D15 is connected to signal line 47. Signal line 46 is also connected through I2 in series with R32 to line 45. Signal line 47 is also connected through I3 in series with R33 to line 45.

It will be appreciated that UJT and its associated capacitor and resistor forms an oscillator circuit. By appropriately choosing the components the oscillator circuit will oscillate at an audible frequency causing the speaker to generate an output tone when the oscillator is oscillating. The oscillator oscillates when either K1-1 or K2-1 is in its upper position since in either case, a completed circuit to signal ground is created. In addition, either I2 or I3 is ignited depending upon whether K1-1 or K2-2 is in its upper position. That is, if K1-1 is in its upper position I3 is ignited and if K2-1 is in its upper position I2 is ignited. I2 and I3 provide visual indications of the mode of operation and the speaker provides an audio indication of operation per se in the manner more fully described hereinafter. R32 and R33 limit the current flow through I2 and I3 so that it stays within their rating.

Turning now to a more complete description of the embodiment of the invention generally described above, when S1 is closed, T1 is energized and applies DC power through the three diode bridges to the current generator 13, the control circuit 15 and the isolating output circuit 17. In addition, the indicator circuit 18 is energized via the control circuit 15.

Assuming initially that the invention is in the coagulation mode of operation, then S3 makes contact with the common junction of C17 and L4 (FIG. 5) and K2 is energized. When K2 is energized, switches K2-1, K2-2 and K2-3 are shifted to the upper contact positions illustrated in FIG. 4. Since K1 is not energized relay circuits K1-1 and K1-2 remain in their lower contact positions. In addition, S2 (the blend/pure switch) may be in either position, since the position of S2 has no effect on the coagulation mode of operation. Because K2-2 is in its upper position, C12 and R25 are connected across the collectors of Q9 and Q10. R 23 and R24 are not connected in the circuit at all since K1-2 is in its lower position. Line 46 is grounded to SG because a completed circuit exists through K2-1 (upper position) and K1-1 (lower position) to SG. Because line 46 is grounded, I2 is ignited to provide an indication on the cabinet housing of the instrument that the invention is in the coagulation mode of operation and the audio oscillator is triggered. Finally, because K2-3 is in its upper position, R30 controls the level of the voltage applied to line 39. Hence, R30 is a coag level control.

The switching of K2-1 to its upper position also removes the signal ground from the base of Q11. This removal allows Q11 to oscillate at a pulse rate suitable for a coagulation waveform. Q11 alternately drives Q12 into conduction and non-conduction. For each period of time Q12 conducts the astable multivibrator (comprised essentially of Q9 and Q10) oscillates. This action provides a burst of RF energy to the voltage divider at a predetermined repetition rate. The voltage divider drops the voltage level of the composite signal in accordance with the adjustment of the coag level potentiometer (R30). The signal is then applied via line 39 to Q1 to reproduce the signal at a higher power level. Conduction of Q1 causes Q2–Q8 to conduct and drive P3 at a very high current level in the form of the signal generated by the control circuit.

As previously described, the inductance of T2 and the capacitance of C3 and C2 are such that they form a resonant circuit. This circuit is adapted to resonate at the frequency of the coag current generated in the manner just described. Because this circuit resonates at this frequency the output impedance is low and, therefore, the voltage across P3 is very high, resulting in a high voltage across lines 41 and 43. This current is applied to the active terminal via the isolating output circuit illustrated in FIG. 5. Since the patient, as is well understood in the art, is lying on an indifferent plate connected to the patient terminal, a completed circuit is created through the patient. Preferably, the sinusoidal voltage has a fundamental frequency of approximately 400KHz and an approximate 700 volt peak-to-peak voltage across P3. Since T2 is a voltage step-up transformer, the resulting voltage across lines 41–43 is yet higher by the turns ratio of T2.

It will be appreciated by those skilled in the art and others that a continuous wave signal of this magnitude and frequency is not desirable for coagulation surgery. Rather, it is desirable to provide a sinusoidal signal that decays at predetermined periods such as about 10 microseconds. As alluded to above, the oscillator creates this decaying action by a very short turn-on, utilizing the natural decay characteristics of the astable multivibrator at turn-off. Preferably, the decaying signal extends over a period of approximately 10 microseconds and occurs at intervals of approximately 40 microseconds. In other words, the signal applied to the active electrode terminal has the general shape illustrated in FIG. 7 where T is 40 microseconds, D is 10 microseconds and A is 4,000 volts, open circuit.

Turning now to a description of the operation of the invention in a cut mode with a blended current signal, in this case S3 is in a position such that C14 is short-circuited. When this occurs, K1 is energized (and K2, of course, is unenergized). Hence, K1-1 and K1-2 of FIG. 4 are in their upper positions and K2-1, K2-2 and K2-3 are in their lower positions. In addition, S2 is in the rightmost position, i.e., B2 is connected to A1 and B4 is connected to A2. Because of these connections, R24 is connected in the circuit to change the bias on the base of Q12. In addition, C12 and R25 are connected across the collectors of Q9 and Q10, as they were in the coag mode of operation. Further, line 47 rather than line 46 is grounded because a completed circuit is made directly through K1-1 to signal ground. Finally, R27, R28 and R31 are connected to output line 39 so that R31 acts as a cut level control. In any event, the oscillator (Q11) again causes a switching signal to occur. However, because R24 is now in the circuit, Q12 is partially biased into conduction by current flow from the power supply through R24 as well as driven by Q11. The summation of this DC bias and the Q11 driving voltage forces the astable multivibrator to operate at high peaks, similar to the coagulation waveform. However, in addition, the astable multivibrator is partially turned on during the absence of the Q11 driving voltage due to the bias voltage provided through R24. Thus, the blended cut signal appears as shown in FIG. 9. From FIG. 9 it will be appreciated that additional energy is provided during time T to allow cutting action. In addition, the high peak voltages necessary for adequate coagulation are present during time D.

Turning now to the final mode of operation, i.e., a cutting mode with a pure signal, the circuit will be as previously described with respect to the cut-blend mode except that S2 will be in its leftmost position. Because K2 is not energized, C12 and R25 are disconnected from the circuit. In addition, R23 is added in parallel with R24 to further change the bias point at the base of Q12 to a point where the drive from Q11 is no longer effective. Because of these changes, a continuous sine wave is generated by the astable multivibrator and applied to the voltage divider. This signal causes a continuous wave to be generated along lines 41 and 43. That is, because Q1 is constantly switched on and off at a particular frequency, Q2–Q8 constantly are switched on and off to generate a continuous wave signal of the type illustrated in FIG. 8. However, because C12 and R25 are not in the circuit, the frequency of the continuous wave is higher than either of the previous frequencies. Because C2, C3 and T2 form the previously described LC resonant circuit that resonates at the coag current frequency, it will be appreciated that the higher frequency is off the resonant frequency. Because the resonant frequency is no longer being used the resonant circuit creates considerable damping and prevents large excursions of voltage when the output is not loaded, i.e., open circuited.

Preferably, chokes L1, L2, L3, L4 and L5 and the structure of T2 are chosen to provide radio frequency isolation from the power line ground (CG). This choice provides a large measure of patient safety by drastically limiting power output to a point below that which would allow patient burn along other paths or permit continued coagulation or cutting when, for any reason, the patient is out of electrical contact with the patient terminal. In other words, when the patient is out of contact with the indifferent electrode he will not be burned at electrodes or other contact points because due to the isolation there are no significant alternate current return paths. More specifically, as is well known to those skilled in the art, electrosurgical (cutting or coagulation) action is caused by high RF current density, i.e., high amperes/$cm^2$. Therefore, the point of the application electrode is relatively small to provide low surface area. Contrawise, the point of return at the indifferent electrode (or patient plate) is maintained as large as feasible to provide low current density and minimal tissue heating and, thus, prevent tissue destruction. Where prior art devices are used, when there are insufficient or no contact between the patient and the indifferent electrode, the current seeks other return paths such as electrodes to patient monitoring equipment or the table on which the patient is lying, for examples. Because these are high current density points burns are likely to occur at these points when this situation occurs. This invention minimizes the likelihood of this situation occurring because of isolating output feature as described herein.

It will be appreciated by those skilled in the art and others that the invention provides a solid state apparatus that provides a variety of currents suitable for use in electrosurgery. The invention provides: a coagulation current; a blended cutting current; or, a pure sinusoidal cutting current, as desired. The solid state power stage is driven by two distinct frequencies the provide substantially different cutting and coagulation characteristics. Because solid state components are used throughout the entire structure of the invention, it is considerably more reliable than prior art devices. In addition, because the invention utilizes common circuitry for the overall system, the problems of two separate machines or a large machine with an extensive number of components are eliminated.

It will also be appreciated by those skilled in the art and others that various changes can be made within the previous description without departing from the spirit and scope of the invention. For example, a foot switch can be coupled to the active electrode terminal wherein the foot switch includes a plurality of switches for desired switching. Hence, the invention can be practiced otherwise than as specifically described herein.

The embodiments of the invention in which an exclusive property or privilege is claimed are defined as follows:

1. An electrosurgical generator suitable for generating cutting and coagulation electrosurgical currents comprising:
   a power stage means including a resonant circuit for selectively generating a cutting current at a voltage and a frequency suitable for performing a cutting electrosurgical operation and a coagulation current at a voltage and a frequency suitable for performing a coagulation electrosurgical operation, the voltage of said cutting current having a substantially constant peak-to-peak value and the voltage of said coagulation current having a decaying envelope with a maximum peak-to-peak value greater than the peak-to-peak value of said cutting current, the frequency of said cutting current being different than the frequency of said coagulation current, said resonant circuit resonating at the frequency of said coagulation current but not at the frequency of said cutting current;
   a control circuit means connected to said power stage means for controlling the operation of said power stage means in a manner such that the cutting current and the coagulation current are selectively generated; and,
   an output circuit means connected to said power stage means for applying the cutting current and the coagulation current selectively generated by said power stage means to instruments suitable for performing cutting and coagulation electrosurgical operations.

2. An electrosurgical generator as claimed in claim 1 wherein said resonant circuit is an LC resonant circuit.

3. An electrosurgical generator as claimed in claim 2 wherein said control circuit means includes an astable multivibrator and an oscillator, said astable multivibrator and said oscillator being connected together so as to generate a combined signal, said combined signal being applied to said power stage so as to selectively control the generation of said cutting current and said coagulation current by said power stage in accordance with the nature of said combined signal.

4. An electrosurgical generator as claimed in claim 3 wherein said output circuit means is coupled to said control circuit means so as to control the nature of said combined signal.

5. An electrosurgical generator as claimed in claim 4 including an indicator circuit means connected to said control circuit means for providing an indication of the mode of operation of said electrosurgical generator.

6. An electrosurgical generator as claimed in claim 5 including a power supply means connected to said power stage means, said control circuit means and said output circuit means for receiving AC power at one level and for applying AC power at different levels to said power stage means, said control circuit means and said output circuit means.

7. An electrosurgical generator as claimed in claim 6 wherein said power stage means comprises:
   a diode bridge circuit connected to said power supply means to rectify the AC power from said power supply means;
   a transformer having primary and secondary windings;
   a first capacitor, said first capacitor being connected across the output of said bridge;
   a second capacitor, the primary winding of said transformer and said second capacitor being connected in series and said series connection being connected in parallel with said first capacitor, said transformer, said first capacitor, and said second capacitor comprising said LC resonant circuit;
   a plurality of power transistors connected in parallel, the emitter-collector junctions of said plurality of power transistors being connected in parallel with said second capacitor; and,
   a control transistor, said control transistor having its base connected to said control circuit means and its emitter-collector junction connected to the bases of said plurality of power transistors and to the primary winding of said transformer.

8. An electrosurgical generator as claimed in claim 7 wherein said control circuit means also includes:
   a capacitor;
   a resistor;
   a first switch, said capacitor, said resistor and said first switch being connected so as to connect said capacitor and resistor in series across the output of said astable multivibrator when said first switch is in a predetermined position;
   a second switch;
   a second resistor, said second resistor and said second switch being connected so as to apply said second resistance between said astable multivibrator and the output of said oscillator when said second switch is in a predetermined position;
   a third switch;
   a third resistor, said third switch and said third resistor being connected so that said third resistor can be connected in parallel with said second resistor when said third switch is in a predetermined position;

a transformer having its primary winding connected across the output of said astable multivibrator, said primary winding having a center tap connected to said oscillator; and, a voltage divider connected to the secondary winding of said transformer for applying the signal on the secondary winding of said transformer to the control transistor of said power stage.

9. An electrosurgical generator as claimed in claim 8 wherein said output circuit includes a plurality of chokes connected so as to isolate the output of said power stage from the power input to said electrosurgical generator.

10. An electrosurgical generator as claimed in claim 2 wherein said power stage means comprises:
   a diode bridge circuit connected to said power supply means to rectify the AC power from said power supply means;
   a transformer having primary and secondary windings;
   a first capacitor, said first capacitor being connected across the output of said bridge;
   a second capacitor, the primary winding of said transformer and said second capacitor being connected in series and said series connection being connected in parallel with said first capacitor, said transformer, said first capacitor and said second capacitor comprising said LC resonant circuit;
   a plurality of power transistors connected in parallel, the emitter-collector junctions of said plurality of power transistors being connected in parallel with said second capacitor; and,
   a control transistor, said control transistor having its base connected to said control circuit means and its emitter-collector junction connected to the bases of said plurality of power transistors and to the primary winding of said transformer.

11. An electrosurgical generator as claimed in claim 1 wherein said control circuit means includes an astable multivibrator and an oscillator, said astable multivibrator and said oscillator being connected together so as to generate a combined signal, said combined signal being applied to said power stage so as to selectively control the generation of said cutting current and said coagulation current by said power stage in accordance with the nature of said combined signal.

12. An electrosurgical generator as claimed in claim 11 wherein said output circuit means is coupled to said control circuit means so as to control the nature of said combined signal.

13. An electrosurgical generator as claimed in claim 12 wherein said power stage means comprises:
   a diode bridge circuit connected to a power supply means to rectify the AC power from said power supply means;
   a transformer having primary and secondary windings;
   a first capacitor, said first capacitor being connected across the output of said bridge;
   a second capacitor, the primary winding of said transformer and said second capacitor being connected in series and said series connection being connected in parallel with said first capacitor, said transformer, said first capacitor and said second capacitor comprising said resonant circuit;
   a plurality of power transistors connected in parallel the emitter-collector junctions of said plurality of power transistors being connected in parallel with said second capacitor; and,
   a control transistor, said control transistor having its base connected to said control circuit means and its emitter-collector junction connected to the bases of said plurality of power transistors and to the primary winding of said transformer.

14. An electrosurgical generator as claimed in claim 13 wherein said control circuit means also includes:
   a capacitor;
   a resistor;
   a first switch, said capacitor, said resistor and said first switch being connected so as to connect said capacitor and resistor in series across the output of said astable multivibrator when said first switch is in a predetermined position;
   a second switch;
   a second resistor, said second resistor and said second switch being connected to as to apply said second resistance between said astable multivibrator and the output of said oscillator when said second switch is in a predetermined position;
   a third switch;
   a third resistor, said third switch and said third resistor being connected so that said third resistor can be connected in parallel with said second resistor when said third switch is in a predetermined position;
   a transformer having its primary winding connected across the output of said astable multivibrator, said primary winding having a center tap connected to said oscillator; and,
   a voltage divider connected to the secondary winding of said transformer for applying the signal on the secondary winding of said transformer to the control transistor of said power stage.

15. An electrosurgical generator as claimed in claim 14 wherein said output circuit includes a plurality of chokes connected so as to isolate the output of said power stage from the power input to said electrosurgical generator.

16. An electrosurgical generator as claimed in claim 1 wherein said output circuit includes a plurality of chokes connected so as to isolate the output of said power stage from the power input to said electrosurgical generator.

17. An electrosurgical generator suitable for generating cutting and coagulation electrosurgical currents comprising:
   a power stage means having frequency responsive characteristics for selectively generating a cutting current at a voltage and a frequency suitable for performing a cutting electrosurgical operation and a coagulation current at a voltage and a frequency suitable for performing a coagulation electrosurgical operation, said coagulation and cutting currents differing substantially in frequency so that said frequency responsive characteristics aid in controlling the voltage magnitude of said cutting and coagulation currents;
   a control circuit means connected to said power stage means for controlling the operation of said power stage means in a manner such that the cutting current and the coagulation current are selectively generated; and, an output circuit means connected to said power stage means for applying the cutting current and the coagulation current selectively generated by said power stage means to instruments suitable for performing cutting and coagulation electrosurgical operations in a manner that isolates said instruments from outside electrical returns.

18. An electrosurgical generator as claimed in claim 17 wherein the frequency responsive characteristics of said power stage means are provided by an LC circuit that resonates at the frequency of said coagulation current.

19. An electrosurgical generator as claimed in claim 17 wherein said output circuit includes a plurality of chokes connected to provide the isolation between said instruments from said outside electrical returns.

20. An electrosurgical generator suitable for generating cutting and coagulation electrosurgical currents comprising:

a power stage means for selectively generating a cutting current at a voltage and a frequency suitable for performing a cutting electrosurgical operation and a coagulation current at a voltage and a frequency suitable for performing a coagulation electrosurgical operation;

a control circuit means connected to said power stage means for controlling the operation of said power stage means in a manner such that the cutting current and the coagulation current are selectively generated; and, an output circuit means connected to said power stage means for applying the cutting current and the coagulation current selectively generated by said power stage means to instruments suitable for performing cutting and coagulation electrosurgical operations in a manner that isolates said instruments from outside electrical returns.

21. An electrosurgical generator suitable for generating cutting and coagulation electrosurgical currents comprising:

a power stage means having frequency responsive characteristics for selectively generating a cutting current at a voltage and a frequency suitable for performing a cutting electrosurgical operation and a coagulation current at a voltage and a frequency suitable for performing a coagulation electrosurgical operation, said coagulation and cutting current differing substantially in frequency so that said frequency responsive characteristics aid in controlling the voltage magnitude of said cutting and coagulation currents;

a control circuit means connected to said power stage means for controlling the operation of said power stage means in a manner such that the cutting current and the coagulation current are selectively generated; and, an output circuit means connected to said power stage means for applying the cutting current and the coagulation current selectively generated by said power stage means to instruments suitable for performing cutting and coagulation electrosurgical operations.

22. An electrosurgical generator suitable for generating electrosurgical cutting and coagulation currents comprising:

a single power stage means for selectively generating a cutting current at a voltage and a frequency suitable for performing an electrosurgical cutting operation, a coagulation current at a voltage and a frequency suitable for performing an electrosurgical coagulation operation, and a blended current at a voltage and a frequency suitable for performing electrosurgical cutting with a minimum amount of hemostasis;

a control circuit means connected to said power stage means for controlling the operation of said power stage means in a manner such that the cutting current, coagulation current and blended current are selectively generated; and, an output circuit means connected to said power stage means for applying the cutting current, the coagulation current and the blended current selectively generated by said power stage means to instruments suitable for performing cutting and coagulation electrosurgical operations.

23. In an electrosurgical apparatus wherein an electrosurgical current, generated by an electrosurgical generator connected to an external power source, is applied to an electrosurgical instrument and returns to said electrosurgical generator via an indifferent electrode electrically contacting a patient to be operated on by said electrosurgical instrument, the improvement comprising isolation means for isolating said electrosurgical generator from all electrical returns other than the return provided by said indifferent electrode.

24. The improvement claimed in claim 23 wherein said isolation means comprises at least one inductor connected to prevent current flow between said external power source and the output of said electrosurgical generator.

* * * * *